Nov. 30, 1954     T. J. JEFFERS     2,695,573
DOUGH COOLER
Filed Jan. 11, 1954
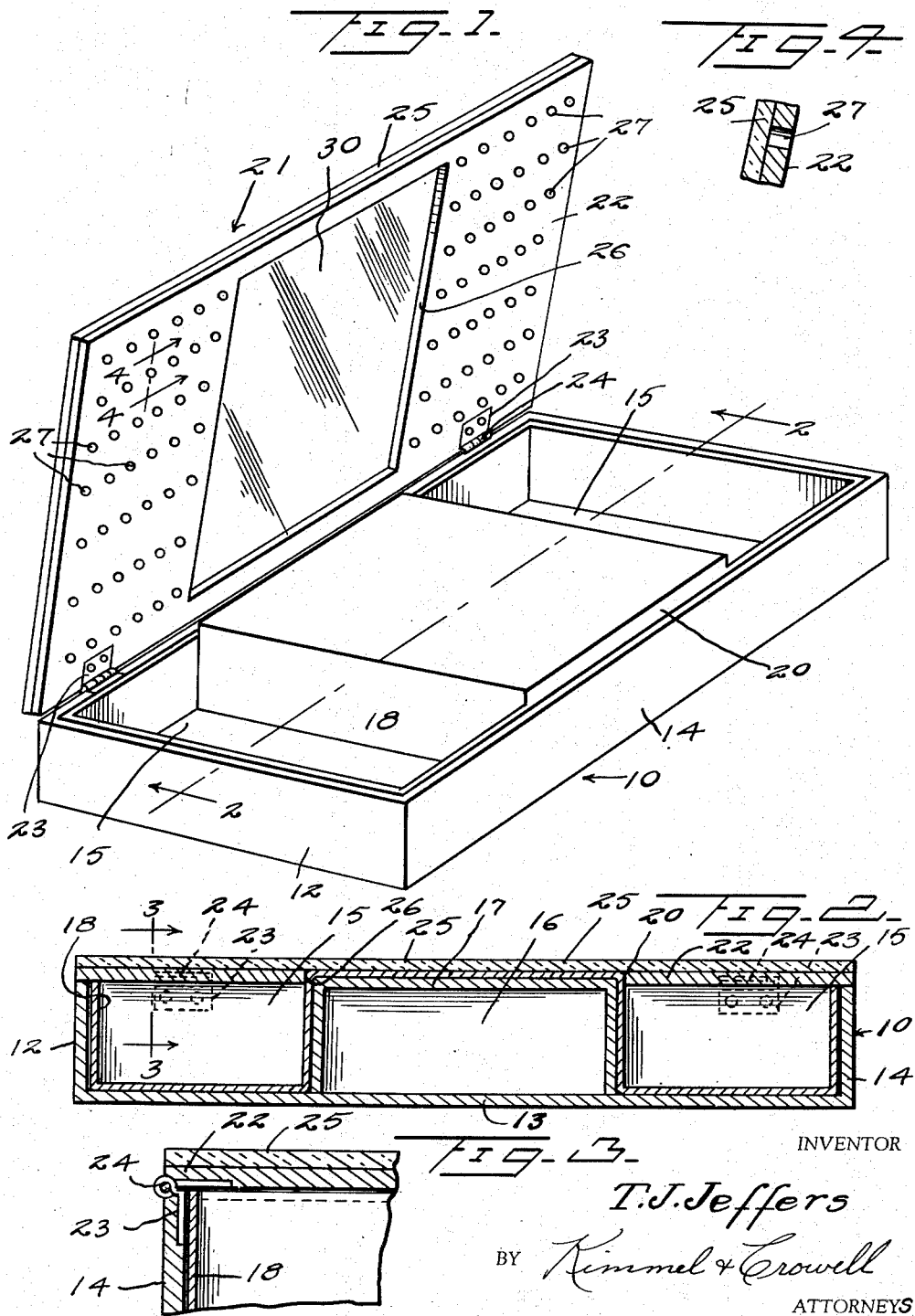
INVENTOR
T. J. Jeffers
BY Kimmel & Crowell
ATTORNEYS United States Patent Office 2,695,573
Patented Nov. 30, 1954

2,695,573

DOUGH COOLER

Thomas J. Jeffers, Chadron, Nebr.

Application January 11, 1954, Serial No. 403,176

4 Claims. (Cl. 107—46)

This invention relates to a dough cooler and has as its primary object the provision of a device for cooling pastry dough or the like during the time the dough is being rolled.

An additional object of the invention is the provision of a glass rolling surface overlying a receptacle containing a cooling medium which is effective in maintaining the glass portion sufficiently cool to preclude the melting of lard, for example, in a pie crust consisting of flour and lard, which frequently occurs when the device upon which the dough is being rolled becomes overheated.

Still another object of the invention is the provision of a device of this character which will provide a firm underlying supporting surface for the glass rolling surface, which surface is preferably comprised of highly conductive material whereby the temperature of the cooling medium, such as Dry Ice or the like positioned adjacent thereto, may be readily transferred to the rolling surface.

Still other objects will in part be obvious and in part be pointed out as the description of the invention proceeds and is shown in the accompanying drawing wherein there is disclosed a preferred embodiment of this inventive concept.

In the drawing:

Figure 1 is a perspective view of the dough cooler of the instant invention showing the rolling surface or lid of the coolant-containing receptacle in raised position;

Figure 2 is a sectional view taken substantially along the line 2—2 of Figure 1, as viewed in the direction indicated by the arrows, with the lid or rolling surface in closed position;

Figure 3 is an enlarged fragmentary sectional view taken substantially along the line 3—3 of Figure 2, as viewed in the direction indicated by the arrows; and Figure 4 is an enlarged sectional view taken substantially along the line 4—4 of Figure 1, as viewed in the direction indicated by the arrows.

Similar reference characters refer to similar parts throughout the several views of the drawing.

Having reference now to the drawing in detail, there is generally indicated at 10 a relatively shallow receptacle, preferably comprised of plywood, and including end walls 12, a bottom 13, and side walls 14. The receptacle is divided into two end compartments 15, by means of a centrally positioned inverted box-like structure 16 including a plywood top portion 17. A liner of metallic material such as sheet tin or tin foil is generally indicated at 18 and covers the sides and ends as well as the bottoms of compartments 15 and extends over the top 17 of the inverted box-like portion 16. It is noted that the top surface of liner 18 is supported by top 17 at a level slightly above the height of end walls 12 and side walls 14, as indicated at 20 in Figures 1 and 2.

The receptacle 10 is provided with a lid, generally indicated at 21, which includes a plywood member 22, which is hinged as by means of hinge leaves 23 pivoted as on pivots 24 to one side wall of receptacle 10. The balsa lid portion 22 is covered by a relatively thick glass plate 25, which is secured thereto in any desired manner. A centrally positioned aperture 26 is cut into the center of balsa lid 22 and is so dimensioned as to overlie top portion 17 of inverted box 16 and its associated metallic covering. The side portions of balsa lid 22 are provided with a plurality of perforations or apertures 27, the purpose of which will be more fully described hereinafter.

In the use and operation of the device, the compartments 15 may be filled with any suitable cooling medium such as ice, although preferably solid carbon dioxide, commercially known as Dry Ice, is most frequently employed.

The lid 21 is then closed and after a brief period of time the glass plate 25 will be cooled through the perforations 27, the normal conductivity of both the glass top 25 and the metal liner 18 serving thoroughly to chill the central part 30 of glass dough rolling surface 25 which overlies top 17.

After the surface is cooled, the central portion thereof which, it is to be noted is firmly supported by top part 17 of inverted receptacle 16, may be utilized as a surface upon which to roll the dough, which is at all times maintained at a sufficiently low temperature to preclude the melting of any of the ingredients, such as lard, therein which have a relatively high melting point.

From the foregoing it will now be seen that there is herein provided an improved dough cooler adapted to form a surface upon which the cooled dough may be readily rolled, which accomplishes all of the objects of this invention, and others, including many advantages of great practical utility and commercial importance.

Obviously, the device may be refilled as frequently as may be necessary.

As many embodiments may be made of this inventive concept, and as many modifications may be made of the embodiment hereinbefore shown and described, it is to be understood that all matter herein is to be interpreted merely as illustrative and not in a limiting sense.

What is claimed is:

1. In a dough cooler, a receptacle including a pair of spaced end compartments and a central block portion; said end compartments being adapted for the reception of a cooling medium, a cover hinged to said receptacle, and having the outer surface of a central portion thereof serving as a dough rolling surface when said lid is closed, and an integral metal sheet forming a lining for said compartments and a cover for said block portion against which said central portion of said hinged cover directly rests, said lining and said cover serving as a heat transfer medium for transferring heat from the outer surface of said central portion of said cover to said cooling medium.

2. In a dough cooler, a receptacle including a pair of spaced end compartments and a central block portion; said end compartments being adapted for the reception of a cooling medium, a cover hinged to said receptacle, and having the outer surface of a central portion thereof serving as a dough rolling surface when said lid is closed, and an integral metal sheet forming a lining for said compartments and a cover for said block portion against which said central portion of said hinged cover directly rests, said lining and said cover serving as a heat transfer medium for transferring heat from the outer surface of said central portion of said cover to said cooling medium, and an insulating sheet on the inner side of said lid, said insulating sheet being cut away under said central portion.

3. In a dough cooler, a receptacle including a pair of spaced end compartments and a central block portion; said end compartments being adapted for the reception of a cooling medium, a cover hinged to said receptacle, and having the outer surface of a central portion thereof serving as a dough rolling surface when said lid is closed, and an integral metal sheet forming a lining for said compartments and a cover for said block portion against which said central portion of said hinged cover directly rests, said lining and said cover serving as a heat transfer medium for transferring heat from the outer surface of said central portion of said cover to said cooling medium, and an insulating sheet on the inner side of said lid, said insulating sheet being cut away under said central portion, said insulating sheet being provided with spaced apertures therethrough.

4. In a dough cooler, a receptacle including a pair of spaced end compartments and a central block portion; said end compartments being adapted for the reception of a cooling medium, a cover hinged to said receptacle, and having the outer surface of a central portion thereof serving as a dough rolling surface when said lid is closed, and an integral metal sheet forming a lining for said compartments and a cover for said block portion against which said central portion of said hinged cover directly rests, said lining and said cover serving as a heat transfer medium for transferring heat from the outer surface of said central portion of said cover to said cooling medium; an insulating sheet on the inner side of said lid, said insulating sheet being cut away under said central portion, said insulating sheet being provided with spaced apertures therethrough, and said lid comprising an integral glass sheet.

References Cited in the file of this patent

UNITED STATES PATENTS

| Number | Name | Date |
| --- | --- | --- |
| 220,459 | Wolf | Oct. 7, 1879 |
| 395,491 | Fuller | Jan. 1, 1889 |
| 457,052 | Metcalf | Aug. 4, 1891 |
| 491,977 | Bingham | Feb. 21, 1893 |
| 797,644 | Trahern | Aug. 22, 1905 |
| 1,443,216 | DeBarry | Jan. 23, 1923 |